US012612530B2

(12) United States Patent
Riepe

(10) Patent No.: US 12,612,530 B2
(45) Date of Patent: Apr. 28, 2026

(54) HYDROPHOBIC FLUID AND USE THEREOF

(71) Applicant: RFH CHEMIE GMBH & CO. KG, Bünde (DE)

(72) Inventor: Bernd Riepe, Bünde (DE)

(73) Assignee: RFH Chemie GmbH & Co. KG, Bünde (DE)

( * ) Notice: Subject to any disclaimer, the term of this patent is extended or adjusted under 35 U.S.C. 154(b) by 1046 days.

(21) Appl. No.: 17/596,521

(22) PCT Filed: Jun. 5, 2020

(86) PCT No.: PCT/EP2020/065671

§ 371 (c)(1),
(2) Date: Dec. 13, 2021

(87) PCT Pub. No.: WO2020/249484

PCT Pub. Date: Dec. 17, 2020

(65) Prior Publication Data

US 2022/0177722 A1      Jun. 9, 2022

(30) Foreign Application Priority Data

Jun. 14, 2019    (DE) ..................... 10 2019 116 282.3

(51) Int. Cl.
| | |
|---|---|
| *C09D 127/12* | (2006.01) |
| *B27D 5/00* | (2006.01) |
| *B27K 3/36* | (2006.01) |
| *B27K 3/40* | (2006.01) |
| *C09D 7/20* | (2018.01) |

(52) U.S. Cl.
CPC ........... *C09D 127/12* (2013.01); *B27D 5/003* (2013.01); *B27K 3/36* (2013.01); *B27K 3/40* (2013.01); *C09D 7/20* (2018.01); *B27K 2240/70* (2013.01)

(58) Field of Classification Search
CPC ....... E04F 15/02; E04F 15/04; E04F 2201/07; B27D 5/003; C09D 133/16; B27K 2240/70; D09D 127/12; D09D 127/14; D09D 127/16; D09D 127/18; D09D 127/20
See application file for complete search history.

(56) References Cited

U.S. PATENT DOCUMENTS

| | | | | | |
|---|---|---|---|---|---|
| 2,000,121 | A | * | 5/1935 | Bush ...................... | C09D 15/00 |
| | | | | | 106/170.42 |
| 5,665,432 | A | * | 9/1997 | Kuwazuru ............. | A01N 57/14 |
| | | | | | 427/393 |
| 8,927,063 | B2 | * | 1/2015 | Frazer ..................... | B05D 7/06 |
| | | | | | 427/397 |
| 2004/0031225 | A1 | * | 2/2004 | Fowler ................... | E04F 15/02 |
| | | | | | 52/592.1 |
| 2010/0058694 | A1 | | 3/2010 | Eiden | |
| 2019/0270219 | A1 | | 9/2019 | Jenkins | |

FOREIGN PATENT DOCUMENTS

| | | | | | |
|---|---|---|---|---|---|
| CN | 105026512 | A | | 11/2015 | |
| CN | 205476178 | U | * | 8/2016 | |
| DE | 102007002395 | A1 | | 7/2008 | |
| JP | 08336813 | A | * | 12/1996 | |
| WO | 2014116377 | A1 | | 7/2014 | |
| WO | 2019060972 | A1 | | 4/2019 | |
| WO | WO-2021124042 | A1 | * | 6/2021 | ............. B27N 7/005 |

OTHER PUBLICATIONS

Machine translation of JP 08336813 (1996, 4 pages).*
WO 2021124042 (2021, 7 pages).*
Lee (An Assessment Study on Stability of Various Coating Treatment of Metallic Artifacts Using V-flon, Journal of Conservation Science, vol. 26, No. 2, 2010, pp. 149-156).*
EverChem (Solvent YK-D80, everChem, 2024, 1 page).*
Crop Protection (Isoparaffinic Hydrocarbon Technical Evaluation Report, Crop Protection, 2008, 9 pages).*
Machine translation of CN 205476178 (2016, 4 pages).*
Citation of Office Action dated Apr. 28, 2020 in related/corresponding DE Application No. 10 2019 116 282.3.
International Search Report mailed Sep. 25, 2020 in related/corresponding International Application No. PCT/EP2020/065671.
Written Opinion mailed Sep. 25, 2020 in related/corresponding International Application No. PCT/EP2020/065671.

* cited by examiner

*Primary Examiner* — Brieann R Johnston
(74) *Attorney, Agent, or Firm* — PATENT PORTFOLIO BUILDERS PLLC

(57) ABSTRACT
A hydrophobic fluid includes a solvent-based solution of at least one aliphatic and/or aromatic hydrocarbon, with a chain length of C9 to C15 and at least one ether, ester, ketone and/or an alcohol, in particular a non-flammable alcohol. The hydrophobic fluid also has a fluoropolymer, in particular a non-combustible fluoropolymer with a flash point>60° C. in a proportion of 0.1 to 30 wt. %.

4 Claims, No Drawings

HYDROPHOBIC FLUID AND USE THEREOF

BACKGROUND AND SUMMARY OF THE INVENTION

Exemplary embodiments of the invention relate to a hydrophobic fluid and its use, in particular in the joint area of two components, at least one of which consists of a wood or wood-based material, if moisture or wetness penetrates into the joint due to manufacturing, which causes the wood or wood-based material to swell.

For the sake of simplicity, only wood will be mentioned below as a moisture-sensitive material, since a wood-based material has comparable properties in this respect, namely that it absorbs moisture.

An example of this problem is flooring boards or the like, which are held together by means of a tongue-and-groove joint, for example.

Although attempts have been made to coat these joint areas with a hydrophobic fluid, all of these have proven to be insufficient in terms of a permanent seal.

This includes, for example, the application of wax, in liquid or paste form, which is problematic both in terms of the service life of this coating and in terms of its application, the latter, in particular, when the individual wooden components are manufactured in large quantities.

Another hydrophobic fluid has become known, but it is flammable or combustible and therefore not suitable, at least for industrial use, as special conditions for occupational safety must be observed here.

The problem of swelling also arises in the case of edge coating of wooden furniture parts, wherein the applied edge hand consists of a plastic, the contact surface of which is designed in the form of an adhesive that can be activated by means of a heat source, wherein a laser source is often used as the heat source.

The advantage of such an edge coating is that a joint with a very narrow gap is created in the transition area between the wooden panel and the edge band, known as the "zero joint".

However, the disadvantage here is also that moisture can penetrate despite the small joint width, with the aforementioned consequences. The risk in this respect is particularly great with such products, as furniture panels processed in this way are often used as worktops, which are frequently exposed to moisture or wetness during use.

Moisture can also penetrate in the area of the formed joint in the case of edge coating where the edge band is attached to the panel by means of glue or adhesive, with the consequences described above.

Exemplary embodiments of the invention are therefore directed to developing a hydrophobic fluid which ensures permanent protection against wetness and moisture and which complies with safety regulations.

According to the invention, there is a hydrophobic fluid comprising a solvent-based solution of at least one aliphatic and/or aromatic hydrocarbon, having a chain length of C9 to C15 and at least one ether, ester, ketone and/or an alcohol, in particular a non-flammable alcohol, wherein the hydrophobic fluid additionally comprises a fluoropolymer, in particular a non-flammable fluoropolymer having a point>60° C. in a proportion of 0.1 to 30 wt. %.

DETAILED DESCRIPTION

Exemplary embodiments are directed to a hydrophobic fluid and use of the hydrophobic fluid, which is a solvent-based solution of at least one aliphatic and/or aromatic hydrocarbon, having a chain length of C9 to C15, and at least one ether, ester, ketone and/or alcohol, wherein the hydrophobic fluid additionally comprises a non-flammable fluoropolymer in a proportion of from 0.1 to 30 wt. %, offers, in comparison with a composition of this type according to the prior art, a large number of advantages which are remarkable both in terms of industrial application and in terms of the use of the components treated therewith.

Thus, it should be mentioned firstly and in particular that the new hydrophobic fluid is non-flammable or at least has reduced flammability due to the use of fluoropolymer having a flash point>60° C., so that this liquid complies with the corresponding requirements of the industrial safety regulations, which allows the use of the liquid in the industrial manufacture of the components. Thus, in the context of the present invention, the flammability of the fluoro polymer used is determined on the basis of the flash point.

The alcohol used may preferably be a non-flammable alcohol, in particular glycol ether having a flash point of more than 60° C.

The application of the hydrophobic fluid to the region where two components are joined together, at least one of which is made of a wood or wood-based based material that tends to swell in the event of moisture or humidity penetration, results in durable protection that even makes it possible to use such components in damp rooms.

These include the tongue-and-groove joints of two components already mentioned in the prior art, known for example under the term "click connection".

A moisture barrier is also ensured by the wetting of a zero joint mentioned above, as occurs when the edge of a furniture panel is coated by means of an edge band that can be bonded by applying heat and pressing it against the edge of the furniture panel.

This also results from the application of the hydrophobic fluid according to the invention to a formed joint after an application of the edge band by means of glue or adhesive.

According to another aspect of the invention, the use of isoparaffins as aliphatic hydrocarbons is particularly advantageous.

The proportion of fluoropolymer is moreover preferably from 2 to 5 wt. %, preferably from 3 to 4 wt. %, while the non-flammable alcohol and/or the ether, in particular the glycol ether, may preferably be present in a proportion of from 2 to 17 wt. %.

Particularly advantageous is that the hydrophobic fluid can be reworked after less than 20 seconds. This relates in particular to an application of varnish and/or paint, e.g., to the joint area or the edge band. Thus, the hydrophobic fluid can be overpainted or painted after a very short time.

No or negligible mixing effects of the applied paint with the hydrophobic fluid occur, so that the area on which the paint is applied takes on the shade of the applied paint. The same applies to the varnish application and the associated gloss.

This means that the hydrophobic fluid can be used in a continuous process for the automated processing of wood or wood-based materials.

Although the invention has been illustrated and described in detail by way of preferred embodiments, the invention is not limited by the examples disclosed, and other variations can be derived from these by the person skilled in the art without leaving the scope of the invention, it is therefore clear that there is a plurality of possible variations. It is also clear that embodiments stated by way of example are only really examples that are not to be seen as limiting the scope, application possibilities or configuration of the invention in any way. In fact, the preceding description and the description or the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:

providing a hydrophobic fluid comprising a solvent-based solution of at least one aliphatic and/or aromatic hydrocarbon, having a chain length of C9 to C15 and a non-flammable alcohol, wherein the hydrophobic fluid additionally comprises a non-flammable fluoropolymer in a proportion of 3 to 4 wt. %; and applying the hydrophobic fluid to a region of a joint between two components, at least one of the two components is a wood or wood-based material.

2. The method of claim 1, wherein the hydrophobic fluid is applied to a tongue-and-groove of the two components forming a joint area of the joint.

3. The method of claim 1, wherein the hydrophobic fluid is applied to an edge region of a furniture panel to be provided with an edge band.

4. The method of claim 1, wherein, after the application of the hydrophobic fluid, a reworkability in terms of a dye and/or varnish applicability, is established within less than 20 seconds.

* * * * *